W. H. FRY.
ENERGY SUPPLY SYSTEM.
APPLICATION FILED MAR. 17, 1915.
1,194,165.
Patented Aug. 8, 1916.
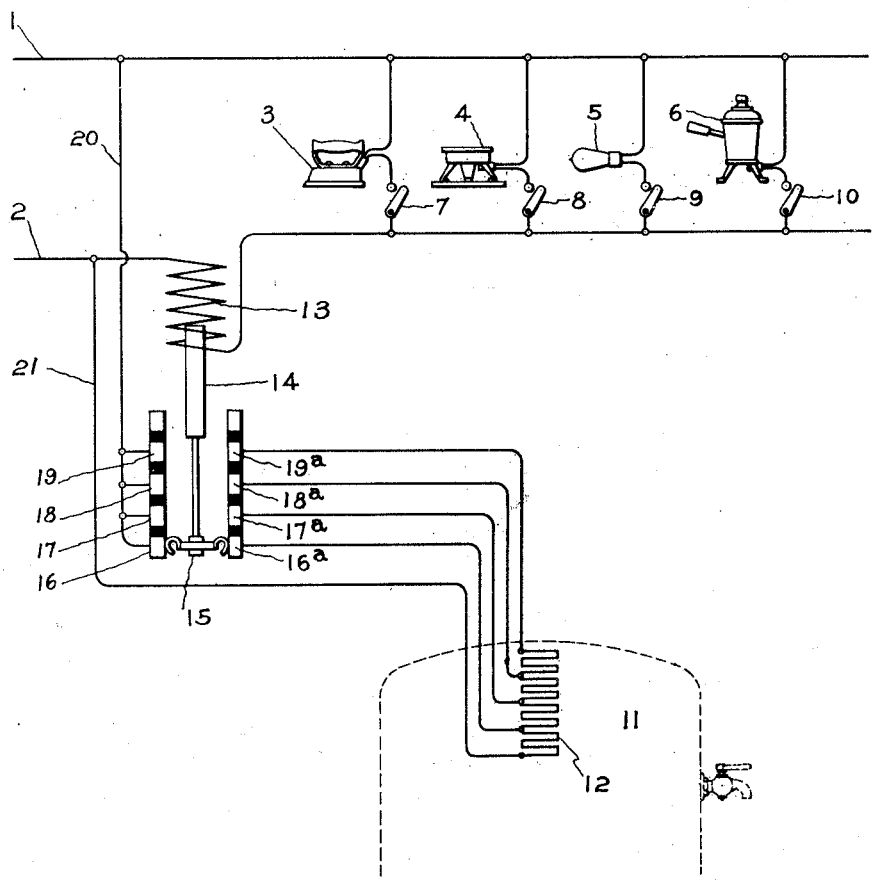
Witnesses:
Helen Orford
Margaret E. Hooley
Inventor:
Winthrop H. Fry,
by Albert G. Davis
His Attorney

UNITED STATES PATENT OFFICE.

WINTHROP H. FRY, OF GREAT BARRINGTON, MASSACHUSETTS, ASSIGNOR TO GENERAL ELECTRIC COMPANY, A CORPORATION OF NEW YORK.

ENERGY-SUPPLY SYSTEM.

1,194,165.   Specification of Letters Patent.   Patented Aug. 8, 1916.

Application filed March 17, 1915. Serial No. 15,117.

*To all whom it may concern:*

Be it known that I, WINTHROP H. FRY, a citizen of the United States, residing at Great Barrington, county of Berkshire, State of Massachusetts, have invented certain new and useful Improvements in Energy-Supply Systems, of which the following is a specification.

My invention has reference to an energy supply system, and more particularly to such a system which takes from the supply circuit energy at a constant rate and utilizes all of the energy so supplied.

It is well known that under ordinary conditions, the central station is heavily loaded during a few hours of the day, and during the remaining hours can find employment for only a fraction of the energy which the station must be capable of supplying in order to take care of the peak load. If the rate of energy supply could, on the other hand, be kept constant, the central station could operate at its maximum efficiency during the entire twenty-four hours, and it could well afford, under such conditions, to supply energy at a lower rate than when the rate of supply varies between wide limits. To this end, heat storage systems have hitherto been used, having a heat storage mass of high heat storage capacity to which electric energy is supplied continuously and at a low rate, and from which the heat may be withdrawn when and as it is to be utilized. A heat storage system of this character is shown in Patent No. 1,025,843, which was issued to William Stanley, May 7th, 1912. Such a system, however, does not provide for the use of other translating devices which are used only intermittently, such, for instance, as the electric flatiron, electric percolator, or even electric lights, and which cause variations of load. It has, therefore, been proposed in conjunction with a heat storage system of this character to use a time switch, as in the Stanley patent above referred to, for disconnecting the heat storage mass from the supply circuit at the time when the load is most likely to be heavy due to the presence on the circuit of other devices. While such a system makes a more nearly continuous demand on the central station than does the ordinary intermittent load, the demand is still variable to a greater or less extent, depending upon conditions.

In accordance with my invention, I maintain a constant load by automatically varying the energy demand of the storage device inversely as the demand of the intermittent part of the load, so that the demand of the intermittent devices plus the demand of the storage device remains constant or substantially so.

For a fuller understanding of my invention, reference may be had to the accompanying drawing, in which I have shown one embodiment thereof.

Referring to the drawing, 1 and 2 are the conductors of a supply circuit from which it is desirable that there shall be a demand of electrical energy at a substantially constant rate. I have indicated the variable load as consisting of a number of translating devices, such as a flat-iron 3, an electric stove 4, an incandescent lamp 5, and a percolator 6, which are connected to the supply conductors by switches 7, 8, 9 and 10, respectively, though it will of course be understood that any number of translating devices and correspondingly any number of switch contacts may be employed.

The heat storage mass is represented by the numeral 11, and I have here shown the same in the form of a water heater provided with a heating element 12, divided into sections, any number of which may be connected in series. A solenoid 13 is included in series with the intermittent load circuit, and is provided with a core 14 to which is connected a bridging member 15. This member is adapted to successively electrically connect contacts 16, 16$^a$, 17, 17$^a$, 18, 18$^a$, and 19, 19$^a$ as the core is attracted. The contacts 16, 17, 18, and 19 are connected by a conductor 20 to the supply conductor 1, while the contacts 16$^a$, 17$^a$, 18$^a$, and 19$^a$ are connected to the resistance member 12 at various points. The lower end of the resistance member is connected by a conductor 21 to the supply conductor 2.

In operation when all of the translating devices constituting the intermittent load are disconnected from the supply circuit, the solenoid 13 is deënergized and the member 15 bridges the contacts 16 and 16$^a$, when only the lower section of the heating element will be included in circuit and the resistance member will take a maximum amount of energy. As the various translating devices are connected to the supply circuit, the plunger 14 will be attracted to positions to successively bridge the contacts 17, 17ᵃ, 18, 18ᵃ, and 19, 19ᵃ, thereby successively including in the heating element successive sections of the resistance member 12, and correspondingly reducing the amount of energy that will be supplied to the heat storage mass. If desirable, when all of the translating devices are connected to the supply circuit, the bridging member 15 may be raised to a position to engage two dead contacts, as illustrated and thus entirely disconnect the heating element of the heat storage mass from the supply circuit.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A system of electric energy supply comprising a supply circuit, a load connected thereto comprising a variable portion and a heat storage mass, and means for varying the rate of energy supply to said heat storage mass in inverse proportion to the variations in the variable part of the load.

2. A system of electric energy supply comprising a supply circuit, a plurality of translating devices connected to said supply circuit, a heat storage device, and means for varying the rate of energy supply to said heat storage device inversely as the rate of supply to the various translating devices.

3. A system of electric energy supply comprising a supply circuit, a load connected thereto comprising a variable portion and a heat storage device, and means responsive to the variable part of the load current for varying the rate of energy supply to said heat storage device inversely as the load current varies, so as to maintain a substantially constant demand on the supply circuit.

4. A system of electric energy supply comprising a supply circuit, a plurality of translating devices connected thereto, an electric heat storage device, and electromagnetic means responsive to the rate of energy supply to the translating devices for varying the amount of energy supplied to the heat storage device inversely as the rate of supply to the translating devices varies.

5. A system of electric energy supply comprising a supply circuit, a plurality of translating devices connected thereto, a heat storage mass, an electromagnet included in series with the translating devices, and means responsive to the movement of the armature of said magnet for varying the rate of energy supplied to said heat storage mass inversely as the rate of supply to the translating devices.

In witness whereof, I have hereunto set my hand this 15th day of Mar., 1915.

WINTHROP H. FRY.

Witnesses:
THOMAS G. CRAWFORD,
LEON F. PARKHURST.